United States Patent
Kim

(10) Patent No.: US 8,993,138 B2
(45) Date of Patent: Mar. 31, 2015

(54) RECHARGEABLE BATTERY

(75) Inventor: Jin-Hee Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1100 days.

(21) Appl. No.: 12/564,033

(22) Filed: Sep. 21, 2009

(65) Prior Publication Data

US 2010/0086835 A1    Apr. 8, 2010

Related U.S. Application Data

(60) Provisional application No. 61/102,275, filed on Oct. 2, 2008.

(51) Int. Cl.
*H01M 14/00* (2006.01)
*H01M 2/12* (2006.01)
(Continued)

(52) U.S. Cl.
CPC .......... *H01M 10/052* (2013.01); *H01M 2/1241* (2013.01); *H01M 2/34* (2013.01); *H01M 2/345* (2013.01); *H01M 4/131* (2013.01); *H01M 10/058* (2013.01); *H01M 10/4235* (2013.01);
(Continued)

(58) Field of Classification Search
USPC ............. 429/7, 53, 54, 55, 56, 57, 58, 59, 61, 429/67, 68, 72, 82, 89, 121, 122, 163, 164, 429/174, 175, 176, 177, 185, 209; 29/623.1, 623.2, 623.4
See application file for complete search history.

(56) References Cited

U.S. PATENT DOCUMENTS 5,427,875 A * 6/1995 Yamamoto et al. ............ 429/223
5,609,972 A * 3/1997 Kaschmitter et al. ........... 429/56
(Continued)

FOREIGN PATENT DOCUMENTS

EP    1 049 189 A1    11/2000
EP    1049189 A1 *    11/2000 ............ H01M 10/40
(Continued)

OTHER PUBLICATIONS

European Search Report dated Jan. 17, 2011, for corresponding European Patent application 09171983.1.
(Continued)

*Primary Examiner* — Philip Tucker
*Assistant Examiner* — Brian R Slawski
(74) *Attorney, Agent, or Firm* — Christie, Parker & Hale, LLP

(57) ABSTRACT

A rechargeable battery according to the present invention includes an electrode assembly that includes a positive electrode, a negative electrode, and a separator between the positive electrode and the negative electrode, a case that contains the electrode assembly and a cap assembly that is connected to the case. The positive electrode includes a current collector and a positive active material layer that includes an NCM-based positive active material disposed at the collector. The cap assembly includes a vent plate having a notch, and a current interrupt portion that interrupts electrical connection in a case of an increase in pressure inside the case. When a current interrupt pressure of the current interrupt portion is "A," a vent fracture pressure at which the vent plate fractures at the notch is "B," and the capacity of the rechargeable battery is "X," they satisfy a formula of A/B=1.22−0.39X+D (−0.08≤D≤0.08).

20 Claims, 5 Drawing Sheets

(51) Int. Cl.
| | | |
|---|---|---|
| *H01M 2/00* | (2006.01) | |
| *H01M 4/82* | (2006.01) | |
| *H01M 6/00* | (2006.01) | |
| *H01M 10/052* | (2010.01) | |
| *H01M 2/34* | (2006.01) | |
| *H01M 4/131* | (2010.01) | |
| *H01M 10/058* | (2010.01) | |
| *H01M 10/42* | (2006.01) | |
| *H01M 4/505* | (2010.01) | |
| *H01M 4/525* | (2010.01) | |

(52) U.S. Cl.
CPC .............. *H01M 4/505* (2013.01); *H01M 4/525* (2013.01); *H01M 2010/4292* (2013.01); *H01M 2200/00* (2013.01); *H01M 2200/20* (2013.01); *Y02E 60/122* (2013.01); *Y02T 10/7011* (2013.01)
USPC ........ 429/56; 429/7; 429/54; 429/61; 429/82; 29/623.2

(56) References Cited

U.S. PATENT DOCUMENTS

| | | | |
|---|---|---|---|
| 6,207,319 | B1 | 3/2001 | Nam |
| 6,706,446 | B2 | 3/2004 | Nakai et al. |
| 2003/0031919 | A1 | 2/2003 | Isozaki et al. |
| 2004/0157127 | A1 | 8/2004 | Choi et al. |
| 2005/0042519 | A1 | 2/2005 | Roh et al. |
| 2006/0078787 | A1* | 4/2006 | Sato et al. ................ 429/62 |
| 2006/0141352 | A1* | 6/2006 | Kato et al. ................ 429/144 |
| 2007/0212609 | A1* | 9/2007 | Iwami ................ 429/231.3 |

FOREIGN PATENT DOCUMENTS

| | | |
|---|---|---|
| EP | 1 119 060 A2 | 7/2001 |
| JP | 06-140011 A | 5/1994 |
| JP | 9-180698 | 7/1997 |
| JP | 11-265700 A | 9/1999 |
| JP | 2000-036293 A | 2/2000 |
| JP | 2000-90963 | 3/2000 |
| JP | 2000-311676 A | 11/2000 |
| JP | 2000-323114 | 11/2000 |
| JP | 2004-139809 A | 5/2004 |
| JP | 2007-250198 A | 9/2007 |
| KR | 10-1999-0084019 | 12/1999 |
| KR | 10-2008-0058967 | 6/2008 |

OTHER PUBLICATIONS

KIPO Letters Patent, Published Nov. 16, 2011, for corresponding Korean Patent Application No. 10-2009-0091320, 18 pages.

European Search Report dated Nov. 9, 2009, for corresponding European Patent application 09171983.1.

SIPO Office Action, with English translation, dated Nov. 2, 2011, for corresponding Chinese Patent Application No. 200910177678.6, 11 pages.

Machine English Translation of JP 06-140011 A, Patent Abstracts of Japan, 10 pages.

Machine English Translation of JP 11-265700 A, Patent Abstracts of Japan, 9 pages.

Machine English Translation of JP 2000-036293 A, Patent Abstracts of Japan, 11 pages.

Machine English Translation of JP 2004-139809 A, Patent Abstracts of Japan, 12 pages.

Machine English Translation of JP 2007-250198 A, Patent Abstracts of Japan, 19 pages.

Notice of Allowance dated Mar. 5, 2013 issued in Japanese Patent Application No. 2009-229882, 2 pages.

Japanese Office action dated Jun. 12, 2012 issued to corresponding Japanese Application No. 2009-229882, 3 pages.

\* cited by examiner

RECHARGEABLE BATTERY

CROSS-REFERENCE TO RELATED APPLICATION

This application claims priority to and the benefit of U.S. Provisional Patent Application No. 61/102,275 filed, Oct. 2, 2008, the entire content of which is incorporated herein by reference.

BACKGROUND OF THE INVENTION

1. Field of the Invention

The present invention relates to a rechargeable battery. More particularly, the present invention relates to a rechargeable battery that includes a cap assembly.

2. Description of the Related Art

Unlike a primary battery, which cannot be recharged, a rechargeable battery can be repeatedly recharged and discharged. A low capacity rechargeable battery (e.g., a rechargeable battery composed of one cell) can be utilized as a power source for driving a small and portable electronic device, such as a mobile phone, a laptop computer and a camcorder. A large capacity rechargeable battery (e.g., a rechargeable battery composed of a plurality of cells connected to form a pack) can be utilized as a power source for driving a motor of a hybrid vehicle.

Rechargeable batteries are produced in various suitable shapes, and typically in a shape of a cylinder or polygon.

Further, a plurality of rechargeable batteries (or battery cells) can be serially connected and included as part of a high capacity rechargeable battery module such that the module can be used for driving a motor of an electric vehicle that needs a large amount of electrical power.

A rechargeable battery is composed of an electrode assembly having a positive electrode, a negative electrode, and a separator between the positive electrode and the negative electrode; a case containing the electrode assembly; and a cap assembly for closing an opening side of the case.

In the case of a cylindrical rechargeable battery, the positive electrode and the negative electrode include parts in the electrode assembly that are not coated with an active material. The positive electrode and negative electrode uncoated parts face opposite directions.

A negative current collector plate is attached to the negative uncoated part, and a positive current collector plate is attached to the positive uncoated part. The negative current collector plate is electrically connected to the case, and the positive electrode current collector plate is electrically connected to the cap assembly and is for supplying the current out of the electrode assembly. Therefore, the case operates as a negative terminal, and a cap-up disposed at the cap assembly operates as a positive terminal.

While a rechargeable battery is repeatedly recharged and discharged, a gas builds up inside the rechargeable battery and internal pressure rises. Thus, if unchecked, the increased internal pressure may cause an explosion of the rechargeable battery. In order to protect from (or prevent) the explosion, a vent plate is provided under the cap-up, having a notch, such that the vent plate fractures at a certain level of pressure.

The vent plate includes a convex portion facing downward, and the convex portion is welded to a sub-plate that is electrically connected to the electrode assembly. When the pressure rises inside the rechargeable battery, the convex portion is first disengaged from the sub-plate, interrupting electric current flow between the vent plate and the sub-plate. If the pressure further increases, the vent plate fractures at the notch, thereby discharging gas to the outside.

A current interrupt pressure (at which electric current is interrupted) and a vent fracture pressure (at which the notch at the vent plate) is fractured are important elements in the aspects of reliability and safety of the rechargeable battery.

That is, if the current interrupt pressure and the vent fracture pressure are set to be low, the safety of the battery increases but this leads to a problem that the battery does not operate even with a small increase in internal pressure.

Particularly, a rechargeable battery having a lithium(li)-nickel(ni)-cobalt(co)-manganese(Mn) oxide($O_2$) (hereinafter "NCM")-based positive active material, shows a different pressure-behavior than a rechargeable battery with a lithium cobalt oxide ($LiCoO_2$, hereinafter "LCO")-based positive active material. As such, the rechargeable battery with an NCM-based positive active material should have different current interrupt pressure and vent fracture pressure than those of a rechargeable battery with an LCO-based positive active material.

If the current interrupt pressure and vent fracture pressure derived for an LCO-based positive active material are directly applied to a battery with an NCM-based positive active material, there will be a problem of reduced reliability and safety of the rechargeable battery.

The above information disclosed in this Background section is only for enhancement of understanding of the background of the invention and therefore it may contain information that does not form the prior art that is already known in this country to a person of ordinary skill in the art.

SUMMARY OF THE INVENTION

An aspect of an embodiment of the present invention is directed toward a rechargeable battery with improved reliability and safety.

A rechargeable battery according to an exemplary embodiment of the present invention includes an electrode assembly that includes a positive electrode, a negative electrode, and a separator between the positive electrode and the negative electrode, a case that contains the electrode assembly and a cap assembly that is connected to the case. The positive electrode includes a current collector and a positive active material layer that is composed of an NCM-based positive active material disposed at the collector. The cap assembly includes a vent plate having a notch, and a current interrupt portion that interrupts electrical connection in the case of an increase in pressure inside the case. Here, the rechargeable battery satisfies A/B=1.22−0.39X+D (−0.08≤D≤0.08) when a current interrupt pressure of the current interrupt portion is "A," a vent fracture pressure at which the vent plate fractures at the notch is "B," and the capacity of the rechargeable battery is "X."

The cap assembly may include a cap-up that is connected to the case, a vent plate that includes a convex portion facing the bottom of the case, a sub-plate that is disposed below the vent plate, welded to the convex portion, and electrically connected to the electrode assembly, a cap-down that is disposed between the vent plate and the sub-plate, and a protrusion that is disposed between the cap-down and the sub-plate.

The current interrupt portion may be a portion where the convex portion and the sub-plate are welded together. The rechargeable battery may have a shape of a cylinder.

The positive active material may contain an overcharge additive that is between about 0.5 and about 2.0 wt %. The overcharge additive may include $LiCO_3$.

The cap-down may be electrically connected to the electrode assembly via a lead member that is electrically connected to the electrode assembly. The sub-plate may be electrically connected to the electrode assembly via the cap-down.

Further, an insulating plate may be disposed between the cap-down and the vent plate.

A rechargeable battery according to another embodiment of the present invention includes an electrode assembly, a case, and a cap assembly. The electrode assembly is composed of a positive electrode, a negative electrode, and a separator between the positive electrode and the negative electrode. The case is for containing the electrode assembly. The cap assembly is coupled to the case. The positive electrode includes a current collector and a positive active material coupled to the current collector. The cap assembly includes a vent plate and a current interrupt portion for interrupting electrical connection due to a current interrupt pressure inside the case. The vent plate has a notch configured to fracture the vent plate due to a vent fracture pressure inside the case. Here, the rechargeable battery satisfies A/B=1.22−0.39X+D (−0.08≤D≤0.08), wherein A represents the current interrupt pressure (kgf/cm$^2$) of the current interrupt portion (170), B represents the vent fracture pressure (kgf/cm$^2$) of the notch (163), and X represents a capacity (Ah) of the rechargeable battery.

In one embodiment, the cap assembly further includes a cap-up, a sub-plate, a cap-down, and a protrusion. The cap-up is coupled to the case. The vent plate is between the cap-up and the sub-plate and includes a convex portion facing a bottom end of the case. The sub-plate is welded to the convex portion, and electrically connected to the electrode assembly. The cap-down is between the vent plate and the sub-plate, and the protrusion is between the cap-down and the sub-plate. Here, the protrusion may include a welded portion for welding the sub-plate and the cap-down together. The rechargeable battery may further include a lead member electrically connected to the electrode assembly, and the cap-down may be electrically connected to the electrode assembly via the lead member. The sub-plate may be electrically connected to the electrode assembly via the cap-down. In addition, the rechargeable battery may further include an insulating plate between the cap-down and the vent plate. The current interrupt portion may include a welded portion for welding the convex portion and the sub-plate together.

In one embodiment, the rechargeable battery has a cylindrical shape.

In one embodiment, the active material has an overcharge additive in an amount between about 0.5 and about 2.0 wt % of the positive active material. The overcharge additive may include a carbon compound. The carbon compound may include lithium carbonate.

In one embodiment, the current interrupt pressure of the current interrupt portion is between about 8 kgf/cm$^2$ and about 9 kgf/cm$^2$.

In one embodiment, the vent fracture pressure of the notch is between about 20 kgf/cm$^2$ and about 25 kgf/cm$^2$.

In one embodiment, the current interrupt pressure of the current interrupt portion is between about 8 kgf/cm$^2$ and about 9 kgf/cm$^2$, and the vent fracture pressure of the notch is between about 20 kgf/cm$^2$ and about 25 kgf/cm$^2$.

In one embodiment, the positive active material is coated on the current collector. The current collector may include aluminum.

In one embodiment, the positive active material is a lithium-nickel-cobalt-manganese oxide (NCM)-based positive active material.

A rechargeable battery according to another embodiment of the present invention includes an electrode assembly, a case, and a cap assembly. The electrode assembly is composed of a positive electrode, a negative electrode, and a separator between the positive electrode and the negative electrode. The case is for containing the electrode assembly. The cap assembly is coupled to the case. The positive electrode includes a current collector and a positive active material coupled to the current collector. The cap assembly includes a vent plate and a current interrupt portion for interrupting electrical connection due to a current interrupt pressure inside the case. The vent plate has a notch configured to fracture the vent plate due to a vent fracture pressure inside the case. The current interrupt pressure of the current interrupt portion is between about 8 kgf/cm$^2$ and about 9 kgf/cm$^2$, and the vent fracture pressure of the notch of the vent plate is between about 20 kgf/cm$^2$ and about 25 kgf/cm$^2$.

In one embodiment, the positive active material is a lithium-nickel-cobalt-manganese oxide (NCM)-based positive active material. The NCM-based positive active material may include an overcharge additive in an amount between about 0.5 and about 2.0 wt % of the positive active material. The overcharge additive may include lithium carbonate.

An embodiment of the present invention provides a method of forming a rechargeable battery including an electrode assembly composed of a positive electrode, a negative electrode, and a separator between the positive electrode and the negative electrode; a case containing the electrode assembly; and a cap assembly coupled to the case, the positive electrode including a current collector and a positive active material coupled to the current collector, the cap assembly including a vent plate and a current interrupt portion, the vent plate having a notch. The method includes configuring the current interrupt portion to interrupt electrical connection due to a current interrupt pressure (kgf/cm$^2$) of A inside the case; configuring the notch to fracture the vent plate due to a vent fracture pressure (kgf/cm$^2$) of B inside the case (112); configuring the rechargeable battery to have a capacity (Ah) of X; and configuring the rechargeable battery to satisfy A/B=1.22−0.39X+D (−0.08≤D≤0.08).

Another embodiment of the present invention provides a method of forming a rechargeable battery including an electrode assembly composed of a positive electrode, a negative electrode, and a separator between the positive electrode and the negative electrode; a case containing the electrode assembly; and a cap assembly coupled to the case, the positive electrode including a current collector and a positive active material coupled to the current collector, the cap assembly including a vent plate and a current interrupt portion for interrupting electrical connection due to a current interrupt pressure inside the case, the vent plate having a notch configured to fracture the vent plate due to a vent fracture pressure inside the case. The method includes setting the current interrupt pressure of the current interrupt portion to be between about 8 kgf/cm$^2$ and about 9 kgf/cm$^2$, and setting the vent fracture pressure of the notch of the vent plate to be between about 20 kgf/cm$^2$ and about 25 kgf/cm$^2$.

As such, according to an embodiment of the present invention, a rechargeable battery with an NCM-based positive active material has improved safety because the electric current is interrupted and the vent is fractured at the correct moment.

In addition, according to an embodiment of the present invention, reliability is enhanced because early interruption of electric current and fracture of the vent are reduced (or prevented).

Moreover, according to an embodiment of the present invention, reliability and safety are further improved due to an overcharge additive in the positive active material.

DESCRIPTION OF REFERENCE NUMERALS INDICATING CERTAIN ELEMENTS IN THE DRAWINGS

| 100: rechargeable battery | 110: electrode assembly |
|---|---|
| 112: positive electrode | 113: negative electrode |
| 114: separator | 120: case |
| 140: cap assembly | 141: positive temperature coefficient element |
| 143: cap-up | 145: insulating member |
| 146: cap-down | 147: sub-plate |
| 160: vent plate | 163: notch |
| 165: convex portion | 170: current interrupt portion |

DETAILED DESCRIPTION OF THE EMBODIMENTS

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention.

Figure 1:
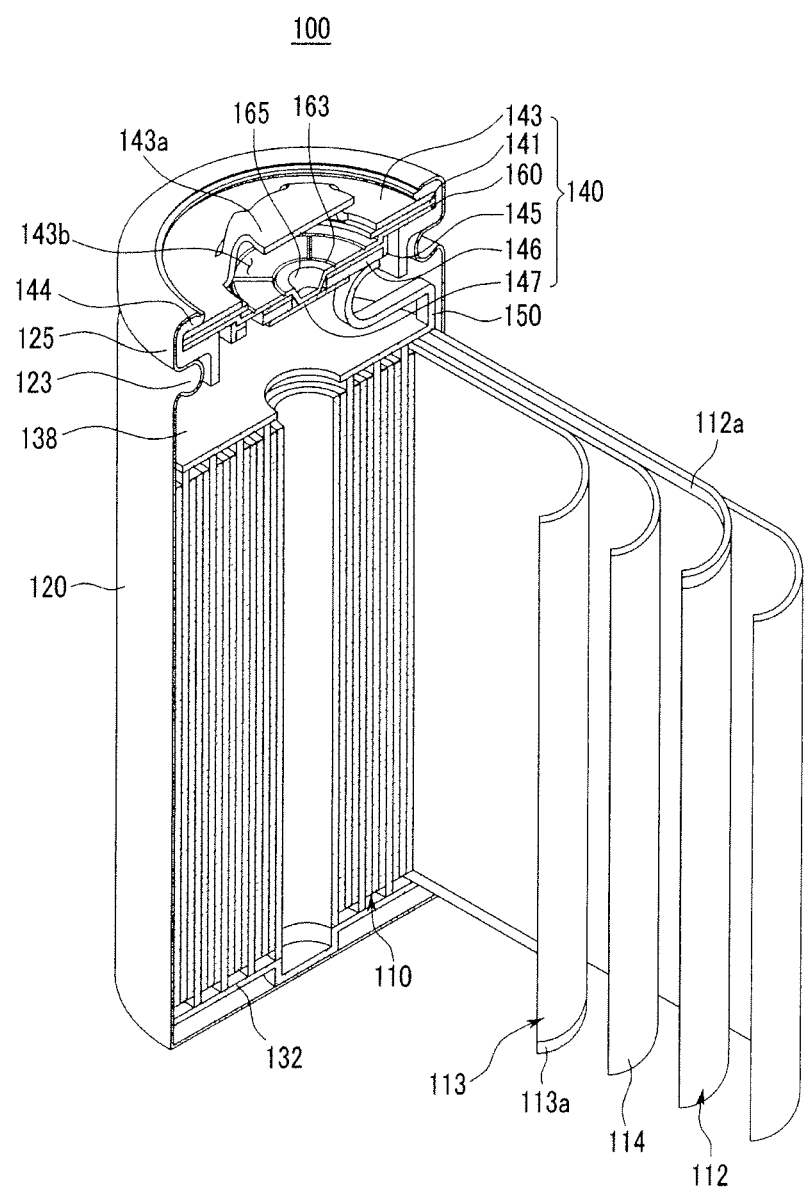
FIG. 1 is a schematic exploded cross-sectional perspective view of a rechargeable battery according to an embodiment of the present invention.

FIG. 1 is a schematic exploded cross-sectional perspective view of a rechargeable battery 100 according to an exemplary embodiment of the present invention.

Referring to FIG. 1, the rechargeable battery includes an electrode assembly 110 that includes a positive electrode 112, a negative electrode 113, and a separator 114 therebetween, and a case 120 that has an opening at one end thereof such that the case 120 can contain the electrode assembly 110 and an electrolyte solution. Further, a cap assembly 140 for closing the case 120 via a gasket 144 is disposed at the opening of the case 120.

More particularly, the case 120 is composed of a conductive metal such as aluminum, an aluminum alloy, or nickel-plated steel.

In addition, the case 120 according to the present exemplary embodiment has a cylindrical shape with an internal space in which the electrode assembly 110 is located. The cap assembly 140 is inserted into the case 120 and then clamped thereto. In this process, a crimped portion 125 and a beaded portion 123 are formed at the case 120.

The electrode assembly 110 is shaped into a cylindrical shape (or into a jelly roll shape) after the positive electrode 112, the separator 114, and the negative electrode 113 are stacked together. However, the structure of the electrode assembly 110 is not limited to this cylindrical shape, and can have various different suitable shapes.

A positive electrode uncoated part 112a, over which a positive active material is not coated, is disposed at an upper end of the positive electrode 112 and is electrically connected to a positive current collector plate 138. In addition, a negative electrode uncoated part 113a, over which a negative active material is not coated, is disposed at the lower end of the negative electrode 113 and is electrically connected to a negative current collector plate 132.

In one embodiment, the negative electrode 113 includes a current collector that is made up of copper or other suitable metal and over which a carbon-based active material is coated. In one embodiment, the positive electrode 112 includes a current collector that is made up of aluminum or other suitable metal and over which an NCM-based positive active material is coated.

The cap assembly 140 includes a cap-up 143 that includes an external terminal 143a that protrudes outward and a gas discharge outlet 143b, and a vent plate 160 that is disposed below the cap-up 143 and includes a notch 163 that fractures at a set (or predetermined) pressure and discharges gas. The vent plate 160 interrupts electrical connection between the electrode assembly 110 and the cap-up 143 at a set (or predetermined) pressure.

A positive temperature coefficient element 141 is disposed between the cap-up 143 and the vent plate 160. The positive temperature coefficient element 141 has electrical resistance that infinitely increases when it exceeds a set (or predetermined) temperature, and interrupts electric current flow when the temperature of the rechargeable battery 100 rises above a set (or predetermined) value.

A convex portion 165 that protrudes downward is disposed at the center of the vent plate 160, and a sub-plate 147 is welded to the bottom surface of the convex portion 165.

A cap-down 146 is disposed between the vent plate 160 and the sub-plate 147, and the cap-down 146 is shaped as a disk that has a hole in the middle such that the convex portion 165 can be inserted into it.

An insulating member 145 is disposed between the cap-down 146 and the vent plate 160, and electrically insulates the cap-down 146 and the vent plate 160. The insulating member 145 has a hole in the middle such that the convex portion 165 of the cap-up 143 can be inserted into it.

Here, the convex portion 165 of the vent plate 160 can pass through the holes and be easily connected to the sub-plate 147.

The sub-plate 147 is welded to the convex portion 165 and the cap-down 146, respectively. The cap-down 146 is electrically connected to the electrode assembly 110 via a lead member 150. Consequently, electric current flows easily into the vent plate 160 and the vent plate 160 is connected to the cap-up 143 and carries the electric current to the external terminal 143a of the cap-up 143.

Figure 2A:
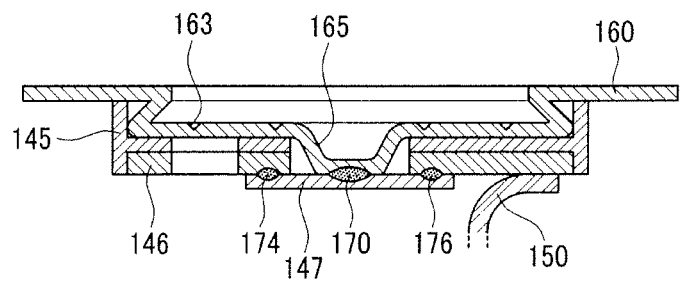
FIG. 2A to FIG. 2C are schematic cross-sectional views of processes of interruption of electric current and fracture of a vent.
Figure 2B:
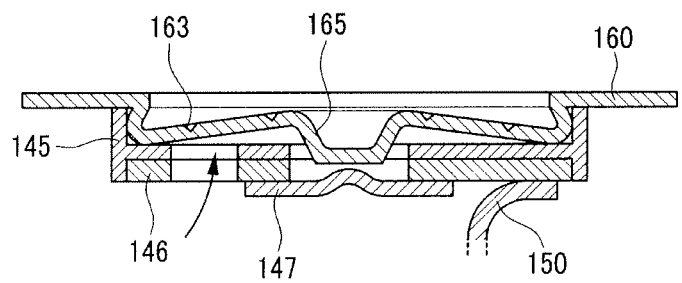
Figure 2C:
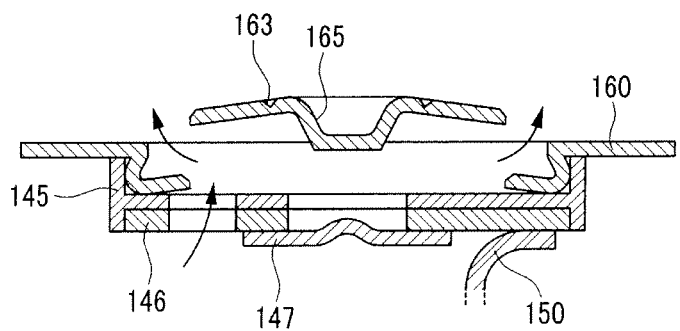

FIG. 2A to FIG. 2C are schematic cross-sectional views of processes of interruption of electric current and fracture of a vent.

Referring to FIG. 2A to FIG. 2C, the sub-plate 147 and the convex portion 165 are connected by ultrasonic welding such that a current interrupt portion 170 is formed between the sub-plate 147 and the convex portion 165. Further, the sub-plate 147 and the cap-down 146 are connected by laser welding such that welded portions 174 and 176 are formed between the sub-plate 147 and the cap-down 16.

If internal pressure increases inside the rechargeable battery due to swelling during repeated recharge and discharge, the convex portion 165 of the current interrupt portion 170 becomes disengaged from the sub-plate 147 due to the increased pressure, as shown in FIG. 2B. When the convex portion 165 is disengaged from the sub-plate 147, electric current flow is interrupted between the vent plate 160 and the sub-plate 147. The pressure at which the convex portion 165 is disengaged from the sub-plate 147 is referred to as "current interrupt pressure."

If, as shown in FIG. 2C, the internal pressure of the battery further increases, the vent plate 160 fractures at the notch 163 and exhausts the gas inside the battery to the outside. The pressure at which the vent plate 160 fractures at the notch 163 is referred to as "vent fracture pressure."

Positive active materials can be divided into LCO ($LiCoO_2$)-based and NCM ($LiNiCoMnO_2$)-based positive active materials. While an LCO-based positive active material enhances safety, the price of cobalt has increased, leading to a discrepancy between supply and demand and reducing profitability. Therefore, research on NCM-based positive active materials is being carried out.

The NCM-based positive active material has a different (or completely different) profile of gas generation caused by a reaction with an electrolyte solution than the LCO-based positive active material. Therefore, it is important to set (or configure) an adequate interrupt pressure and an adequate vent fracture pressure for a battery made with the NCM-based positive active material.

Figure 3:
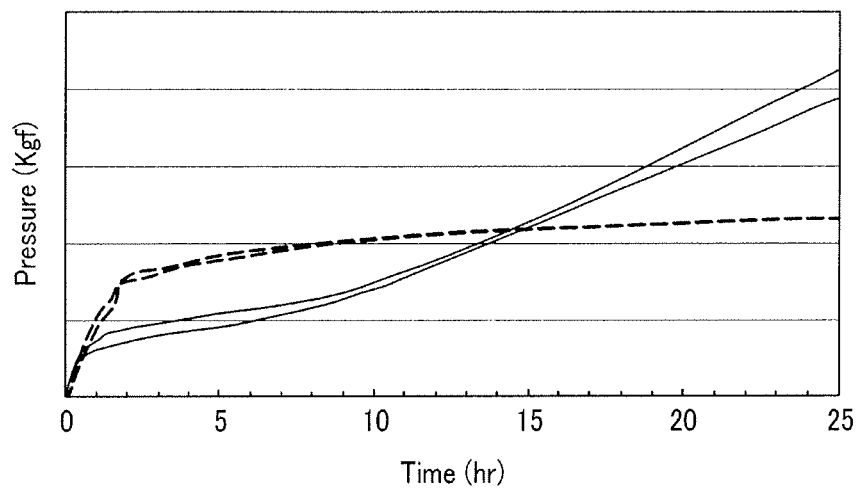
FIG. 3 is a graph showing changes in pressure inside a rechargeable battery with an LCO-based positive active material and a rechargeable battery with an NCM-based positive active material with time when the batteries are fully charged and kept at 90° C.

FIG. 3 is a graph showing changes in pressure inside the rechargeable battery with time when it is fully charged and kept at 90° C. As shown in FIG. 3, the LCO-based positive active material shows a small amount of gas generation during the initial period, but it shows a rapid increase of the amount of the gas generated after a certain (or predetermined) time period. By contrast, the NCM-based positive active material shows a large amount of gas generated during the initial time period but shows almost no further increase in the amount of the gas over time.

Both reliability and safety must be ensured with regard to a rechargeable battery, but the reliability is inversely related to safety.

Enhanced safety leads to reduced reliability and vice versa. For instance, it is desired to set a high current interrupt pressure in order to satisfy a criterion of reliability in stable battery operation (i.e., no interruption of battery operation) of the CID (current interrupt device) for 8 hours while a fully-charged rechargeable battery remains at 90° C. The category of 90° C. is used for determining reliability such that mobile devices are not turned off even at an extremely high temperature. By contrast, it is desired to set a low current interrupt pressure because the current interrupt pressure is related to the amount of gas generated during the overcharge. That is, because overcharge current must be interrupted before combustion and explosion in order to satisfy a criterion of safety that there must be no combustion and explosion while a rechargeable battery is adiabatically overcharged at a 2 C rate.

The biggest cause of generation of gas inside the battery is that electrolyte solution decomposes through a reaction of the electrolyte solution and the positive active material.

The present invention will be described in more detail with reference to the following examples. However, these examples are for illustrative purposes only and are not intended to limit the scope of the present invention.

TABLE 1

|  | Positive electrode active material | LiCO3 (wt %) | Current interrupt pressure (kgf/cm$^2$) | Vent fracture pressure (kgf/cm$^2$) | First criterion 90° C. (current interrupt time, hr) | Second criterion 2 C adiabatic overcharge | Third criterion 150° C. exposure to heat (combustion time, min) |
|---|---|---|---|---|---|---|---|
| Comparative Example 1 | LCO | 0 | 6 | 26 | OK (15.0) | OK | OK (15) |
| Comparative Example 2 | LCO | 0 | 7 | 30 | OK (16.1) | OK | OK (16) |
| Comparative Example 3 | NCM | 0 | 6 | 26 | NG (6.3) | NG | NG (7) |
| Comparative Example 4 | NCM | 0 | 7 | 30 | NG (7.2) | NG | NG (8) |
| Comparative Example 5 | NCM | 0 | 6 | 20 | NG (6.4) | NG | OK (20) |
| Comparative Example 6 | NCM | 0 | 7 | 25 | NG (6.5) | NG | OK (22) |
| Comparative Example 7 | NCM | 0 | 8 | 26 | OK (10.2) | NG | NG (5) |
| Comparative Example 8 | NCM | 0 | 9 | 30 | OK (9.3) | NG | NG (6) |
| Comparative Example 9 | NCM | 0.2 | 8 | 20 | OK (8.9) | NG | OK (21) |
| Comparative Example 10 | NCM | 0.2 | 9 | 25 | OK (9.5) | NG | OK (19) |
| Comparative Example 11 | NCM | 0.4 | 8 | 20 | OK (10.5) | NG | OK (17) |
| Comparative Example 12 | NCM | 0.4 | 9 | 25 | OK (11) | NG | OK (18) |
| Comparative Example 13 | NCM | 2.2 | 8 | 20 | NG (5.6) | OK | OK (22) |
| Comparative Example 14 | NCM | 2.2 | 9 | 25 | NG (5.8) | OK | OK (23) |

TABLE 1-continued

|  | Positive electrode active material | LiCO3 (wt %) | Current interrupt pressure (kgf/cm$^2$) | Vent fracture pressure (kgf/cm$^2$) | First criterion 90° C. (current interrupt time, hr) | Second criterion 2 C adiabatic overcharge | Third criterion 150° C. exposure to heat (combustion time, min) |
|---|---|---|---|---|---|---|---|
| Comparative Example 15 | NCM | 1.0 | 11 | 20 | OK (10.2) | NG | OK (23) |
| Comparative Example 16 | NCM | 1.0 | 9 | 18 | NG (4.6) | OK | OK (20) |
| Exemplary Embodiment 1 | NCM | 0.5 | 8 | 20 | OK (12.5) | OK | OK (30) |
| Exemplary Embodiment 2 | NCM | 0.5 | 9 | 25 | OK (13.6) | OK | OK (31) |
| Exemplary Embodiment 3 | NCM | 1.0 | 8 | 20 | OK (15.7) | OK | OK (33) |
| Exemplary Embodiment 4 | NCM | 1.0 | 9 | 25 | OK (16.5) | OK | OK (29) |
| Exemplary Embodiment 5 | NCM | 2.0 | 8 | 20 | OK (17.1) | OK | OK (30) |
| Exemplary Embodiment 6 | NCM | 2.0 | 9 | 25 | OK (19.9) | OK | OK (32) |

Table 1 shows results of experiments regarding the three criteria according to the positive active material, the current interrupt pressure, and the vent fracture pressure.

The first criterion is directed toward the change in voltage after ten batteries fully charged at 1 C (2.4 Ah) rate and 4.2V are put into an oven heated to 90° C. Here, if the current is not interrupted for 8 hours and the voltage is kept above 4.0V, the criterion is categorized as "OK" or otherwise as "NG."

The second criterion is directed toward ten batteries fully charged at a 1 C (2.4 Ah) rate and 4.2V are surrounded by an insulating material and then overcharged at a 2 C rate and 18V for 3 hours. Here, if the current is interrupted and there is no combustion or rupture, the criterion is categorized as "OK" or otherwise as "NG."

The third criterion is directed toward the change in voltage and temperature after ten batteries that are fully charged at a 1 C (2.4 Ah) rate and 4.2V are put into an oven. The temperature of the oven is increased at a rate of 5° C. per minute and reaches 150° C. after 30 minutes. If the vent does not fracture and there is no combustion and rupture within 10 minutes after the temperature of the battery reaches 150° C., the criterion is categorized as "OK" or otherwise as "NG."

The first criterion is about reliability and the second and third criteria are about safety.

COMPARATIVE EXAMPLE

Comparative Example 1 is directed toward a battery with an LCO-based positive active material, wherein the current interrupt pressure was set at 6 Kgf/cm$^2$ and the vent fracture pressure was set at 26 Kgf/cm$^2$. Comparative Example 2 is directed toward a battery with an LCO-based positive active material, wherein the current interrupt pressure was set at 7 Kgf/cm$^2$ and the vent fracture pressure was set at 30 Kgf/cm$^2$. Referring to Table 1, Comparative Examples 1 and 2 satisfy the first, second, and third criteria.

The LCO-based positive active material, with a small amount of gas generation, satisfied all of the above criteria.

Comparative Example 3 is directed toward a battery with an NCM-based positive active material, wherein the current interrupt pressure was set at 6 Kgf/cm$^2$ and the vent fracture pressure was set at 26 Kgf/cm$^2$. Comparative Example 4 is directed toward a battery with an NCM-based positive active material, wherein the current interrupt pressure was set at 7 Kgf/cm$^2$ and the vent fracture pressure was set at 30 Kgf/cm$^2$. Referring to Table 1, Comparative Examples 3 and 4 satisfied none of the criteria.

The NCM-based positive active material does not ensure reliability and safety under the above conditions since its gas generation pattern differs from that of an LCO-based positive active material.

Comparative Example 5 is directed toward a battery with an NCM-based positive active material, wherein the current interrupt pressure was set at 6 Kgf/cm$^2$ and the vent fracture pressure was set at 20 Kgf/cm$^2$. Comparative Example 6 is directed toward a battery with an NCM-based positive active material, wherein the current interrupt pressure was set at 6 Kgf/cm$^2$ and the vent fracture pressure was set at 25 Kgf/cm$^2$. It was regarded that the NCM-based positive active material was not able to satisfy the safety criterion in the Comparative Examples 3 and 4; the amount of generated gas was not sufficient to fracture the vent even in the case of exposure to heat since it generates less gas over time. Therefore, the vent fracture pressure was lowered.

Referring to Table 1, Comparative Examples 5 and 6 satisfied the third criterion but did not satisfy the first and the second criteria.

An NCM-base positive active material generates a lot of gas initially and reaches the current interrupt pressure earlier than an LCO-based positive active material when kept at 90° C. Accordingly, a battery with an NCM-based positive active material is able to satisfy the first criterion in which the current interrupt device does not interrupt battery operation for 8 hours when the battery is kept at 90° C., only if its current interrupt pressure is set to be higher than that of an LCO-based positive active material.

Comparative Example 7 is directed toward a battery with an NCM-based positive active material, wherein the current interrupt pressure was set at 8 Kgf/cm$^2$ and the vent fracture pressure was set at 26 Kgf/cm$^2$. Comparative Example 8 is directed toward a battery with an NCM-based positive active material, wherein the current interrupt pressure was set at 9 Kgf/cm$^2$ and the vent fracture pressure was set at 30 Kgf/cm$^2$.

As shown in Table 1, with high current interrupt pressure Comparative Examples 7 and 8 satisfied the first criterion but did not satisfy the second and the third criteria.

From the above comparative examples, it was determined that the first and third criteria could be satisfied with control of the current interrupt pressure and the vent fracture pressure. However, the second criteria could not be easily satisfied with the control of the current interrupt pressure and the vent fracture pressure.

An overcharge additive was introduced in order to satisfy the second criterion. $LiCO_3$, an overcharge additive, reacts with an electrolyte solution and generates gas in case of overcharge. With a controlled amount of $LiCO_3$, a gas that can reach the current interrupt pressure only in case of overcharge can be generated.

Comparative Example 9 is directed toward a battery with an NCM-based positive active material, wherein the current interrupt pressure was set at 8 $Kgf/cm^2$, the vent fracture pressure was set at 20 $Kgf/cm^2$, and 0.2 wt % of $LiCO_3$ was added to the positive active material. Comparative Example 10 is directed toward a battery with an NCM-based positive active material, wherein the current interrupt pressure was set at 9 $Kgf/cm^2$, the vent fracture pressure was set at 25 $Kgf/cm^2$, and 0.2 wt % of $LiCO_3$ was added to the positive active material.

As shown in Table 1, with high current interrupt pressure and vent fracture pressure, Comparative Examples 9 and 10 satisfied the first and third criteria but did not satisfy the second criterion due to the small amount of $LiCO_3$.

Comparative Example 11 is directed toward a battery with an NCM-based positive active material, wherein the current interrupt pressure was set at 8 $Kgf/cm^2$, the vent fracture pressure was set at 20 $Kgf/cm^2$, and 0.4 wt % of $LiCO_3$ was added to the positive active material. Comparative Example 12 is directed toward a battery with an NCM-based positive active material, wherein the current interrupt pressure was set at 9 $Kgf/cm^2$, the vent fracture pressure was set at 25 $Kgf/cm^2$, and 0.4 wt % of $LiCO_3$ was added to the positive active material.

As shown in Table 1, with high current interrupt pressure and vent fracture pressure, Comparative Examples 11 and 12 satisfied the first and third criteria, but did not satisfy the second criterion due to the small amount of $LiCO_3$.

Comparative Example 13 is directed toward a battery with an NCM-based positive active material, wherein the current interrupt pressure was set at 8 $Kgf/cm^2$, the vent fracture pressure was set at 20 $Kgf/cm^2$, and 2.2 wt % of $LiCO_3$ was added to the positive active material. Comparative Example 14 is directed toward a battery with an NCM-based positive active material, wherein the current interrupt pressure was set at 9 $Kgf/cm^2$, the vent fracture pressure was set at 25 $Kgf/cm^2$, and 2.2 wt % of $LiCO_3$ was added to the positive active material.

As shown in Table 1, with a high vent fracture pressure and a large amount of $LiCO_3$, Comparative Examples 13 and 14 satisfied the second and third criteria, but did not satisfy the first criterion since the electric current was interrupted early due to too much $LiCO_3$.

Comparative Example 15 is directed toward a battery with an NCM-based positive active material, wherein the current interrupt pressure was set at 11 $Kgf/cm^2$, the vent fracture pressure was set at 20 $Kgf/cm^2$, and 1.0 wt % of $LiCO_3$ was added to the positive active material. As shown in Table 1, with the current interrupt pressure of 11 $Kgf/cm^1$ higher than 9 $Kgf/cm^2$, Comparative Example 15 did not satisfy the second criterion; combustion occurred as the current was not interrupted at the right moment.

Comparative Example 16 is directed toward a battery with an NCM-based positive active material, wherein the current interrupt pressure was set at 9 $Kgf/cm^2$, the vent fracture pressure was set at 18 $Kgf/cm^2$, and 1.0 wt % of $LiCO_3$ was added to the positive active material. As shown in Table 1, with the current interrupt pressure of 18 $Kgf/cm^2$ lower than 20 $Kgf/cm^2$, Comparative Example 16 was faced with a problem that the vent fractured too early.

<Exemplary Embodiments>

Exemplary Embodiment 1 is directed toward a battery with an NCM-based positive active material, wherein the current interrupt pressure was set at 8 $Kgf/cm^2$, the vent fracture pressure was set at 20 $Kgf/cm^2$, and 0.5 wt % of $LiCO_3$ was added to the positive active material.

As shown in Table 1, with a high current interrupt pressure and vent fracture pressure as well as an appropriate amount of $LiCO_3$, Exemplary Embodiment 1 satisfied the first, second, and third criteria.

Exemplary Embodiment 2 is directed toward a battery with an NCM-based positive active material, wherein the current interrupt pressure was set at 9 $Kgf/cm^2$, the vent fracture pressure was set at 25 $Kgf/cm^2$, and 0.5 wt % of $LiCO_3$ was added to the positive active material.

As shown in Table 1, with a high current interrupt pressure and vent fracture pressure as well as an appropriate amount of $LiCO_3$, Exemplary Embodiment 2 satisfied the first, second, and third criteria.

Exemplary Embodiment 3 is directed toward a battery with an NCM-based positive active material, wherein the current interrupt pressure was set at 8 $Kgf/cm^2$, the vent fracture pressure was set at 20 $Kgf/cm^2$, and 1.0 wt % of $LiCO_3$ was added to the positive active material.

As shown in Table 1, with a high current interrupt pressure and vent fracture pressure as well as an appropriate amount of $LiCO_3$, Exemplary Embodiment 3 satisfied the first, second, and third criteria.

Exemplary Embodiment 4 is directed toward a battery with an NCM-based positive active material, wherein the current interrupt pressure was set at 9 $Kgf/cm^2$, the vent fracture pressure was set at 25 $Kgf/cm^2$, and 1.0 wt % of $LiCO_3$ was added to the positive active material.

As shown in Table 1, with a high current interrupt pressure and vent fracture pressure as well as an appropriate amount of $LiCO_3$, Exemplary Embodiment 4 satisfied the first, second, and third criteria.

Exemplary Embodiment 5 is directed toward a battery with an NCM-based positive active material, wherein the current interrupt pressure was set at 8 $Kgf/cm^2$, the vent fracture pressure was set at 20 $Kgf/cm^2$, and 2.0 wt % of $LiCO_3$ was added to the positive active material.

As shown in Table 1, with a high current interrupt pressure and vent fracture pressure as well as an appropriate amount of $LiCO_3$, Exemplary Embodiment 5 satisfied the first, second, and third criteria.

Exemplary Embodiment 6 is directed toward a battery with an NCM-based positive active material, wherein the current interrupt pressure was set at 9 $Kgf/cm^2$, the vent fracture pressure was set at 25 $Kgf/cm^2$, and 2.0 wt % of $LiCO_3$ was added to the positive active material.

As shown in Table 1, with a high current interrupt pressure and vent fracture pressure as well as an appropriate amount of $LiCO_3$, Exemplary Embodiment 6 satisfied the first, second, and third criteria.

As described above, a battery with an NCM-based positive active material shows the desired effect when the amount of $LiCO_3$, an overcharge additive added to the positive active material, is between 0.5 wt % and 2.0 wt %. That is, as shown in Comparative Examples 11 and 12, when less than 0.5 wt % of the overcharge additive was added, the amount of generated gas was small, causing a problem that the electric current was not interrupted at the right moment and combustion occurred. In addition, as shown in Comparative Examples 13 and 14, when more than 2.0 wt % of the overcharge additive was added, so much gas was generated that reliability was reduced.

Further, a battery with an NCM-based positive active material showed the desired effect when the current interrupt pressure was set between 8 Kgf/cm² and 9 Kgf/cm² and the vent fracture pressure was set between 20 Kgf/cm² and 25 Kgf/cm².

That is, as shown in Comparative Example 6, if the current interrupt pressure was lower than 8 Kgf/cm², the electric current was interrupted too early even without the danger of combustion, thereby deteriorating reliability. In addition, as shown in Comparative Example 15, if the current interrupt pressure was higher than 9 Kgf/cm², the electric current was not interrupted at the right moment, causing a problem of combustion or explosion.

Further, as shown in Comparative Example 16, if the vent fracture pressure was lower than 20 Kgf/cm², the vent fractured too early; and as shown in Comparative Example 7, if the vent fracture pressure was higher than 25 Kgf/cm², the vent did not fracture at the right moment, triggering combustion or explosion of the battery.

However, the current interrupt pressure and the vent fracture pressure vary with battery capacity. Their relationship is shown in FIG. 4 and FIG. 5.

Figure 4:
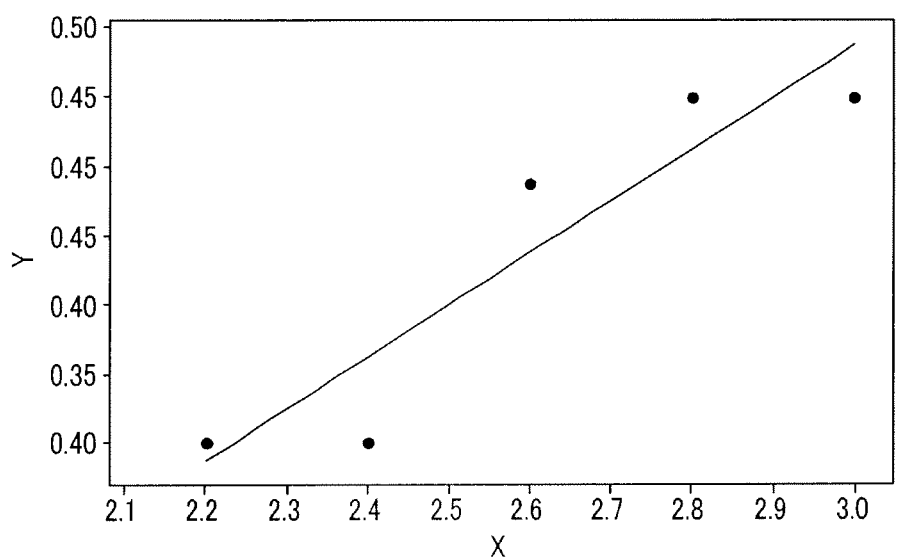
FIG. 4 is a graph illustrating the relationship between current interrupt pressure and vent fracture pressure according to capacity of a battery with an LCO-based positive active material.
Figure 5:
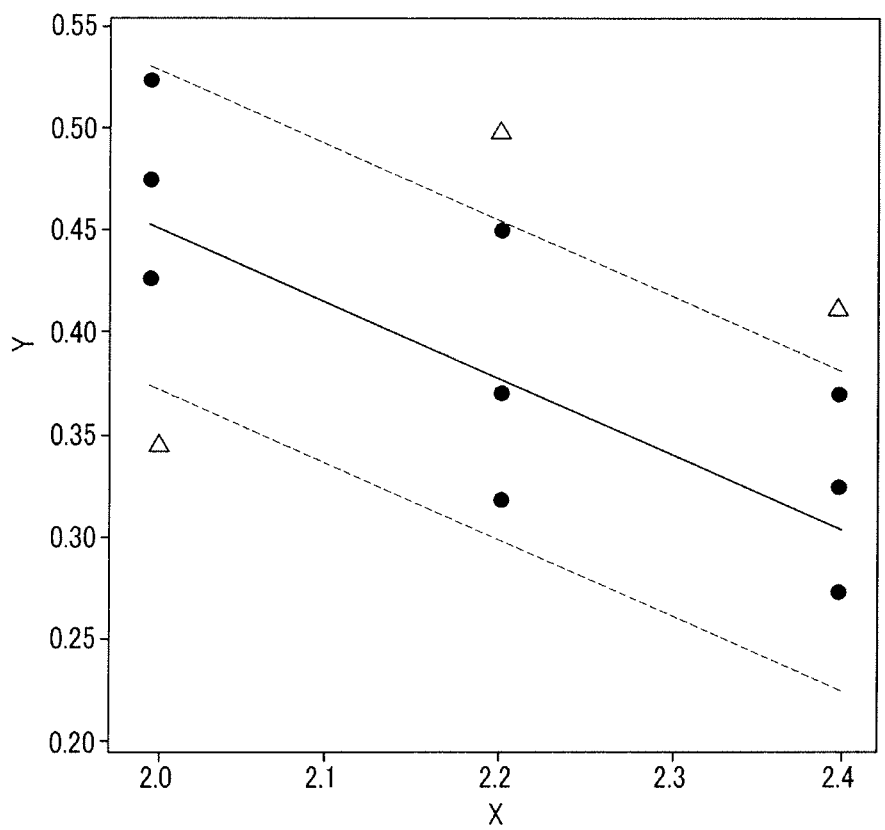
FIG. 5 is a graph illustrating the relationship between current interrupt pressure and vent fracture pressure according to capacity of a battery with an NCM-based positive active material.

FIG. 4 is a graph illustrating the relationship between current interrupt pressure and vent fracture pressure according to capacity of a battery with an LCO-based positive active material.

TABLE 2

| Capacity (Ah) = X | 2.2 | 2.4 | 2.6 | 2.8 | 3.0 |
|---|---|---|---|---|---|
| Current interrupt pressure (Kgf/cm²) = A | 8 | 8 | 9.5 | 15 | 15 |
| Vent fracture pressure (Kgf/cm²) = B | 20 | 20 | 20 | 30 | 30 |
| A/B = Y | 0.4 | 0.4 | 0.48 | 0.5 | 0.5 |

Table 2 shows a relationship of current interrupt pressure and vent fracture pressure with battery capacity, and the graph in FIG. 4 was drawn based upon Table 2.

As shown in FIG. 4, the battery with an LCO-based positive active material shows an increase in the value of Y as the capacity increases. Y is the ratio of current interrupt pressure to vent fracture pressure.

Based upon the above data, the relationship between the capacity (X) and the ratio (Y) of current interrupt pressure to the vent fracture pressure can be shown via the following Relationship 1 below, which is also graphically shown in FIG. 4.

$$Y=0.06500+0.1500*X \qquad \text{Relationship 1}$$

Referring to Relationship 1, an LCO-based positive active material shows an increase in the ratio (Y) of the current interrupt pressure and the vent fracture pressure according to an increase in the capacity (X).

FIG. 5 is a graph illustrating the relationship between current interrupt pressure and vent fracture pressure according to capacity of a battery with an NCM-based positive active material.

Table 3 shows a relationship of current interrupt pressure and vent fracture pressure with battery capacity, and the graph in FIG. 5 was drawn based upon Table 3.

The data in Table 3 is represented with circular dots in FIG. 5.

As shown in FIG. 5, the battery with an NCM-based positive active material shows a gradual decrease in the value of Y as the capacity increases. Y is the ratio of current interrupt pressure to vent fracture pressure.

Based upon the above data, the relationship between the capacity (X) and the ratio (Y) of current interrupt pressure to the vent fracture pressure can be shown via the following Relationship 2, which is also graphically shown in FIG. 5.

$$Y=1.22-0.39*X+D(-0.08 \le D \le 0.08) \text{ or } Y=1.224-0.3875*X+D(-0.08 \le D \le 0.08) \qquad \text{Relationship 2}$$

In FIG. 5, the solid line represents Y=1.22−0.39X, and the dotted lines represent Y=1.22−0.39X+0.08 and Y=1.22−0.39X−0.08, respectively.

Referring to Relationship 2, an NCM-based positive active material shows a decrease in the ratio (Y) of the current interrupt pressure to the vent fracture pressure according to an increase in the capacity (X).

TABLE 4

| | Capacity (Ah) = X | | |
|---|---|---|---|
| | 2.0 | 2.2 | 2.4 |
| Current interrupt pressure (Kgf/cm²) = A | 9.0 | 7.0 | 8 |
| Vent fracture pressure (Kgf/cm²) = B | 26 | 14 | 19 |
| A/B = Y | 0.346 | 0.5 | 0.42 |

Table 4 shows a comparative example, which is represented with triangular dots in FIG. 5. When the capacity was 2.0 Ah, the vent did not fracture, causing an explosion of the battery; and, when the capacity was 2.2 Ah, the electric current was interrupted too early and the vent fractured too early, failing to ensure reliability. Further, when the capacity was 2.4 Ah, the vent fractured too early, deteriorating reliability.

A rechargeable battery with an NCM-based positive active material is able to ensure reliability and safety as long as the relationship between the current interrupt pressure and the vent fracture pressure according to the capacity follows the above Relationship 2.

To put it another way, a rechargeable battery needs to ensure both its reliability and safety. However, reliability of the battery is inversely related to its safety. In addition, an LCO-based positive active material generates a small amount of gas during its initial operation time period, but it generates a large amount of gas after a certain time period. By contrast, an NCM-based positive active material generates a large amount of gas during its initial operation time period, but it generates no further increase in the amount of the gas over time.

As such, in view of the above, an embodiment of the present invention includes a rechargeable battery that has an

TABLE 3

| Capacity (Ah) = X | 2.0 | 2.0 | 2.0 | 2.2 | 2.2 | 2.2 | 2.4 | 2.4 | 2.4 |
|---|---|---|---|---|---|---|---|---|---|
| Current interrupt pressure (Kgf/cm²) = A | 9.0 | 9.5 | 9.5 | 8 | 8.5 | 9.0 | 8 | 8 | 8 |
| Vent fracture pressure (Kgf/cm²) = B | 21.2 | 18.1 | 20 | 25 | 18 | 24.3 | 21.6 | 25 | 30 |
| A/B = Y | 0.425 | 0.525 | 0.475 | 0.32 | 0.47 | 0.37 | 0.37 | 0.32 | 0.27 | electrode assembly including a positive electrode, a case containing the electrode assembly, and a cap assembly coupled to the case. Here, the positive electrode includes a current collector and an NCM-based positive active material coupled to the current collector, and the cap assembly includes a current interrupt portion and a vent plate having a notch. The current interrupt portion is configured to interrupt electrical connection due to a current interrupt pressure (kgf/cm$^2$) of A inside the case. The notch is configured to fracture the vent plate due to a vent fracture pressure (kgf/cm$^2$) of B inside the case. The rechargeable battery is configured to have a capacity (Ah) of X, and the rechargeable battery is configured to satisfy A/B=1.22−0.39X+D (−0.08≤D≤0.08).

In one embodiment, the current interrupt pressure of the current interrupt portion is between about 8 kgf/cm$^2$ and about 9 kgf/cm$^2$, and the vent fracture pressure of the notch of the vent plate is between about 20 kgf/cm$^2$ and about 25 kgf/cm$^2$. In addition, the NCM-based positive active material may include an overcharge additive in an amount between about 0.5 and about 2.0 wt % of the positive active material. The overcharge additive includes LiCO3. As such, the rechargeable battery with the NCM-based positive active material has improved safety and reliability because the electric current is interrupted and the vent is fractured at the proper moment. In addition, reliability and safety are further improved due to the overcharge additive in the positive active material.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable battery comprising:
an electrode assembly comprising a positive electrode, a negative electrode, and a separator between the positive electrode and the negative electrode;
a case containing the electrode assembly; and
a cap assembly coupled to the case,
the positive electrode comprising a current collector and a positive active material coupled to the current collector, the positive active material comprising a lithium(li)-nickel(Ni) -cobalt(Co)-manganese(Mn) oxide(O$_2$) (NCM)-based positive active material,
the cap assembly comprising a vent plate and a current interrupt portion for interrupting electrical connection due to a current interrupt pressure inside the case, a sub-plate, a cap-down between the vent plate and the sub-plate in a vertical direction,
the sub-plate being ventless,
the vent plate having a notch configured to fracture the vent plate due to a vent fracture pressure inside the case, and
the rechargeable battery satisfying:

$$A/B=1.22-0.39X+D(-0.08 \le D \le 0.08),$$

wherein:
A represents the current interrupt pressure (kgf/cm$^2$) of the current interrupt portion;
B represents the vent fracture pressure (kgf/cm$^2$) of the notch, and
X represents a capacity (Ah) of the rechargeable battery.

2. The rechargeable battery of claim 1, wherein the cap assembly comprises:
a cap-up coupled to the case;
the vent plate being between the cap-up and the sub-plate and comprising a convex portion facing a bottom end of the case; and
the sub-plate being welded to the convex portion, and electrically connected to the electrode assembly.

3. The rechargeable battery of claim 2, further comprising a lead member electrically connected to the electrode assembly, wherein the cap-down is electrically connected to the electrode assembly via the lead member.

4. The rechargeable battery of claim 2, wherein the sub-plate is electrically connected to the electrode assembly via the cap-down.

5. The rechargeable battery of claim 2, further comprising an insulating plate between the cap-down and the vent plate.

6. The rechargeable battery of claim 2, wherein the current interrupt portion comprises a welded portion for welding the convex portion and the sub-plate together.

7. The rechargeable battery of claim 1, wherein the rechargeable battery has a cylindrical shape.

8. The rechargeable battery of claim 1, wherein the active material comprises an overcharge additive in an amount between about 0.5 and about 2.0 wt % of the positive active material.

9. The rechargeable battery of claim 8, wherein the overcharge additive comprises a carbon compound.

10. The rechargeable battery of claim 9, wherein the carbon compound comprises lithium carbonate.

11. The rechargeable battery of claim 1, wherein the current interrupt pressure of the current interrupt portion is between about 8 kgf/cm$^2$ and about 9 kgf/cm$^2$.

12. The rechargeable battery of claim 1, wherein the vent fracture pressure of the notch is between about 20 kgf/cm$^2$ and about 25 kgf/cm$^2$.

13. The rechargeable battery of claim 1, wherein:
the current interrupt pressure of the current interrupt portion is between about 8 kgf/cm$^2$ and about 9 kgf/cm$^2$, and
the vent fracture pressure of the notch is between about 20 kgf/cm$^2$ and about 25 kgf/cm$^2$.

14. The rechargeable battery of claim 1, wherein the positive active material is coated on the current collector.

15. The rechargeable battery of claim 14, wherein the current collector comprises aluminum.

16. A rechargeable battery comprising:
an electrode assembly comprising a positive electrode, a negative electrode, and a separator between the positive electrode and the negative electrode;
a case containing the electrode assembly;
a cap assembly coupled to the case;
the positive electrode comprising a current collector and a positive active material coupled to the current collector, the positive active material comprising a lithium(Li)-nickel(ni) -cobalt(Co)-manganese(Mn) oxide(O$_2$) (NCM)-based positive active material,
the cap assembly comprising a vent plate and a current interrupt portion for interrupting electrical connection due to a current interrupt pressure inside the case, a sub-plate, a cap-down between the vent plate and the sub-plate in a vertical direction,
the sub-plate being ventless,
the vent plate having a notch configured to fracture the vent plate due to a vent fracture pressure inside the case,
the current interrupt pressure of the current interrupt portion being between about 8 kgf/cm$^2$ and about 9 kgf/cm$^2$, and
the vent fracture pressure of the notch of the vent plate being between about 20 kgf/cm$^2$ and about 25 kgf/cm$^2$.

17. The rechargeable battery of claim 16, wherein the NCM-based positive active material comprises an overcharge additive in an amount between about 0.5 and about 2.0 wt% of the positive active material.

18. The rechargeable battery of claim 17, wherein the overcharge additive comprises lithium carbonate.

19. A method of forming a rechargeable battery comprising: an electrode assembly comprising a positive electrode comprising a lithium(Li)-nickel(Ni) -cobalt(Co)-manganese (Mn) oxide($O_2$) (NCM)-based positive active material, a negative electrode, and a separator between the positive electrode and the negative electrode; a case containing the electrode assembly; and a cap assembly coupled to the case, the positive electrode comprising a current collector and a positive active material coupled to the current collector, the cap assembly comprising a vent plate and a current interrupt portion, the vent plate having a notch, a sub-plate, a cap-down between the vent plate and the sub-plate in a vertical direction, the sub-plate being ventless, the method comprising:
- configuring the current interrupt portion to interrupt electrical connection due to a current interrupt pressure (kgf/cm$^2$) of A inside the case;
- configuring the notch to fracture the vent plate due to a vent fracture pressure (kgf/cm$^2$) of B inside the case;
- configuring the rechargeable battery to have a capacity (Ah) of X; and
- configuring the rechargeable battery to satisfy A/B =1.22− 0.39X+D (−0.08<D<0.08), wherein A represents the current interrupt pressure (kgf/cm$^2$) of the current interrupt portion, B represents the vent fracture pressure (kgf/cm$^2$) of the notch, X represents a capacity (Ah) of the rechargeable battery, and 2.0 <X <3.0.

20. A method of forming a rechargeable battery comprising: an electrode assembly comprising a positive electrode comprising a lithium(Li)-nickel(Ni) -cobalt(Co)-manganese (Mn) oxide($0_2$) (NCM)-based positive active material, a negative electrode, and a separator between the positive electrode and the negative electrode; a case containing the electrode assembly; and a cap assembly coupled to the case, the positive electrode comprising a current collector and a positive active material coupled to the current collector, the cap assembly comprising a vent plate and a current interrupt portion for interrupting electrical connection due to a current interrupt pressure inside the case, the vent plate having a notch configured to fracture the vent plate due to a vent fracture pressure inside the case, a sub-plate, a cap-down between the vent plate and the sub-plate in a vertical direction, the sub-plate being ventless, the method comprising:
- setting the current interrupt pressure of the current interrupt portion to be between about 8 kgf/cm$^2$, and about 9 kgf/cm$^2$, and
- setting the vent fracture pressure of the notch of the vent plate to be between about 20 kgf/cm$^2$ and about 25 kgf/cm$^2$.

* * * * *